United States Patent
Frontera-Mariani

(10) Patent No.: US 9,733,648 B2
(45) Date of Patent: Aug. 15, 2017

(54) AUTOMATIC EXCESS WATER FLOW SAVING SYSTEM

(71) Applicant: Rene Frontera-Mariani, Yauco, PR (US)

(72) Inventor: Rene Frontera-Mariani, Yauco, PR (US)

( * ) Notice: Subject to any disclaimer, the term of this patent is extended or adjusted under 35 U.S.C. 154(b) by 283 days.

(21) Appl. No.: 13/961,539

(22) Filed: Aug. 7, 2013

(65) Prior Publication Data

US 2015/0040989 A1     Feb. 12, 2015

(51) Int. Cl.
*F16K 11/074* (2006.01)
*G05D 7/06* (2006.01)
*E03B 7/07* (2006.01)

(52) U.S. Cl.
CPC ............ *G05D 7/0629* (2013.01); *E03B 7/075* (2013.01); *Y10T 137/0379* (2015.04); *Y10T 137/7761* (2015.04); *Y10T 137/86389* (2015.04); *Y10T 137/86405* (2015.04)

(58) Field of Classification Search
CPC ......... Y10T 137/7761; Y10T 137/7847; Y10T 137/86405; Y10T 137/86413; Y10T 137/86421
USPC .......................... 251/129.17, 129.07, 129.15
See application file for complete search history.

(56) References Cited

U.S. PATENT DOCUMENTS

| | | | | |
|---|---|---|---|---|
| 4,249,565 A | * | 2/1981 | Brust | F16K 31/00 137/487.5 |
| 4,280,530 A | * | 7/1981 | Yi | A01G 25/165 137/599.11 |
| 4,503,887 A | * | 3/1985 | Johnson | F16K 31/402 137/601.13 |
| 4,911,200 A | * | 3/1990 | Ben-Arie | G01M 3/2807 137/486 |
| 5,000,224 A | * | 3/1991 | Olson, Jr. | F16K 31/402 137/487.5 |
| 5,228,469 A | * | 7/1993 | Otten | A01G 25/16 137/466 |
| 5,503,175 A | * | 4/1996 | Ravilious | E03B 7/071 137/1 |
| 6,016,836 A | * | 1/2000 | Brunkhardt | E03C 1/08 137/624.11 |
| 6,129,103 A | * | 10/2000 | Fields | F16K 31/48 137/1 |
| 2002/0189679 A1 | * | 12/2002 | Avis | F16K 17/30 137/462 |
| 2008/0251145 A1 | * | 10/2008 | Brunkhardt | E03B 7/071 137/624.11 |
| 2011/0163249 A1 | * | 7/2011 | Meikle | G01F 1/28 251/65 |

* cited by examiner

*Primary Examiner* — R. K. Arundale
(74) *Attorney, Agent, or Firm* — Pillsbury Winthrop Shaw Pittman LLP

(57) ABSTRACT

An automatic excess water flow saving system reduces the water loss by water outlets in houses and other water consuming installations. The system controls the water flow through an outlet by toggling the water flow rate. An actuator activates a timer which opens and closes a valve intermittently and continuously while a water outlet is open.

17 Claims, 7 Drawing Sheets

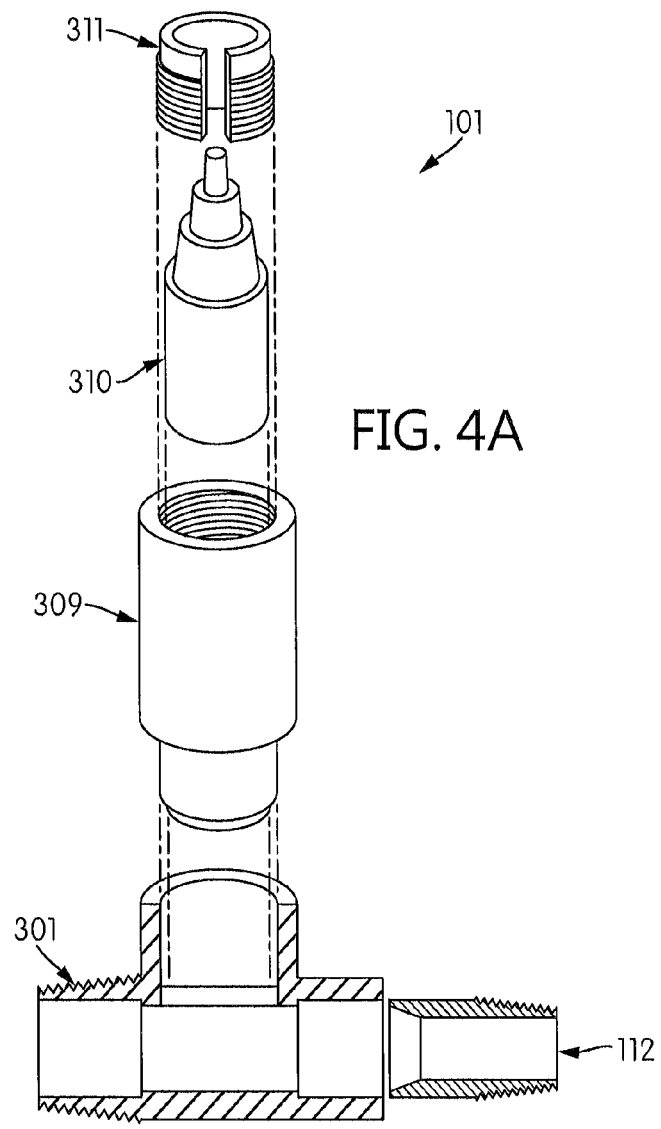
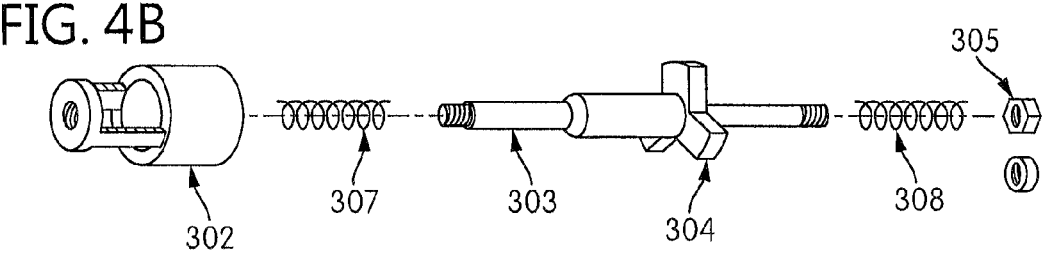

AUTOMATIC EXCESS WATER FLOW SAVING SYSTEM

FIELD OF INVENTION

Embodiments of the invention relate to a system to reduce water loss by water outlets in houses and other water installations.

BACKGROUND

According to some estimates, the average American family uses more than 300 gallons of water per day. Much of the water is wasted and simply flows down the drain. When a water outlet, such as a faucet, is opened in a house or other buildings, water flows from the outlet at a constant stream. Often times, the stream of water is greater than what is needed. In order to control the strength of the stream, the faucet must be manually manipulated. For example, the fixture can be adjusted to achieve a lower flow rate. However, users would typically just turn the faucet to a full open position, thereby causing wasted water.

A need exists for an automatic system to control the excess water flow.

SUMMARY

Embodiments of the invention solve these and others problems in the art by providing an automatic excess water flow saving system.

In one aspect, an automatic excess water flow saving system is disclosed. In one embodiment, the system includes an actuator, a valve, and a timer. The system is adapted to be installed on a water line carrying water into a house, building, or other water installations. When a water outlet connected to the water line is opened, the actuator activates the timer and the timer in turn causes the valve to open and close. In an embodiment, the system includes an enclosure box to contain the actuator, valve, and timer.

In an embodiment, the valve is a normally closed solenoid valve that is modified with a bypass hole. In an embodiment, when activated, the timer causes the valve to open and close intermittently. The frequency at which the timer opens and closes the valve may be adjustable.

In another aspect, an actuator for use in an automatic excess water flow saving system is disclosed. In one embodiment, the actuator includes a body, a proximity switch, and a proximity switch target. The proximity switch target moves into a sensing region to turn on the proximity switch when a water outlet is opened.

In an embodiment, the proximity switch turns on a timer when the proximity switch is turned on. In an embodiment, the actuator is attached to a valve. The body of the actuator may be a pipe tee.

In a third aspect, a method for automatically regulating water flow from a water outlet is disclosed. In an embodiment, when a water outlet is opened, a proximity switch in an actuator is activated causing a timer to turn on. The timer in turn causes a valve to open and close intermittently. In an embodiment, the proximity switch is activated by water pressure from the open water outlet causing a proximity switch target to move into a sensing region of the proximity switch.

In an embodiment, the opening and closing of the valve causes the water flow rate to toggle between a first flow rate and a second flow rate. The frequency at which the timer causes the valve to open and close may be adjusted. In an embodiment, the timer causes the valve to open and close continuously while the water outlet is open. When the water outlet is closed, the proximity switch is de-activated and the timer is turned off.

The various objects, features, and advantages of the invention will be apparent through the detailed description and the drawings attached hereto. It is also to be understood that the following detailed description is exemplary and not restrictive of the scope of the invention.

BRIEF DESCRIPTION OF THE DRAWINGS

FIGS. 4A and 4B show an exploded view of an actuator;

Like reference numbers are used to designate like parts in the accompanying drawings.

DETAILED DESCRIPTION

Embodiments of the invention provide an automatic excess water flow saving system to reduce water loss by water outlets, such as faucets. The system is to be installed onto the main line of a water supplying pipe to a house, building, or other water consuming installation. When a water outlet is opened, the system automatically regulates the water flow by continuously toggling the water flow between a partial flow and full flow, thereby achieving water volume saving.

Figure 1:
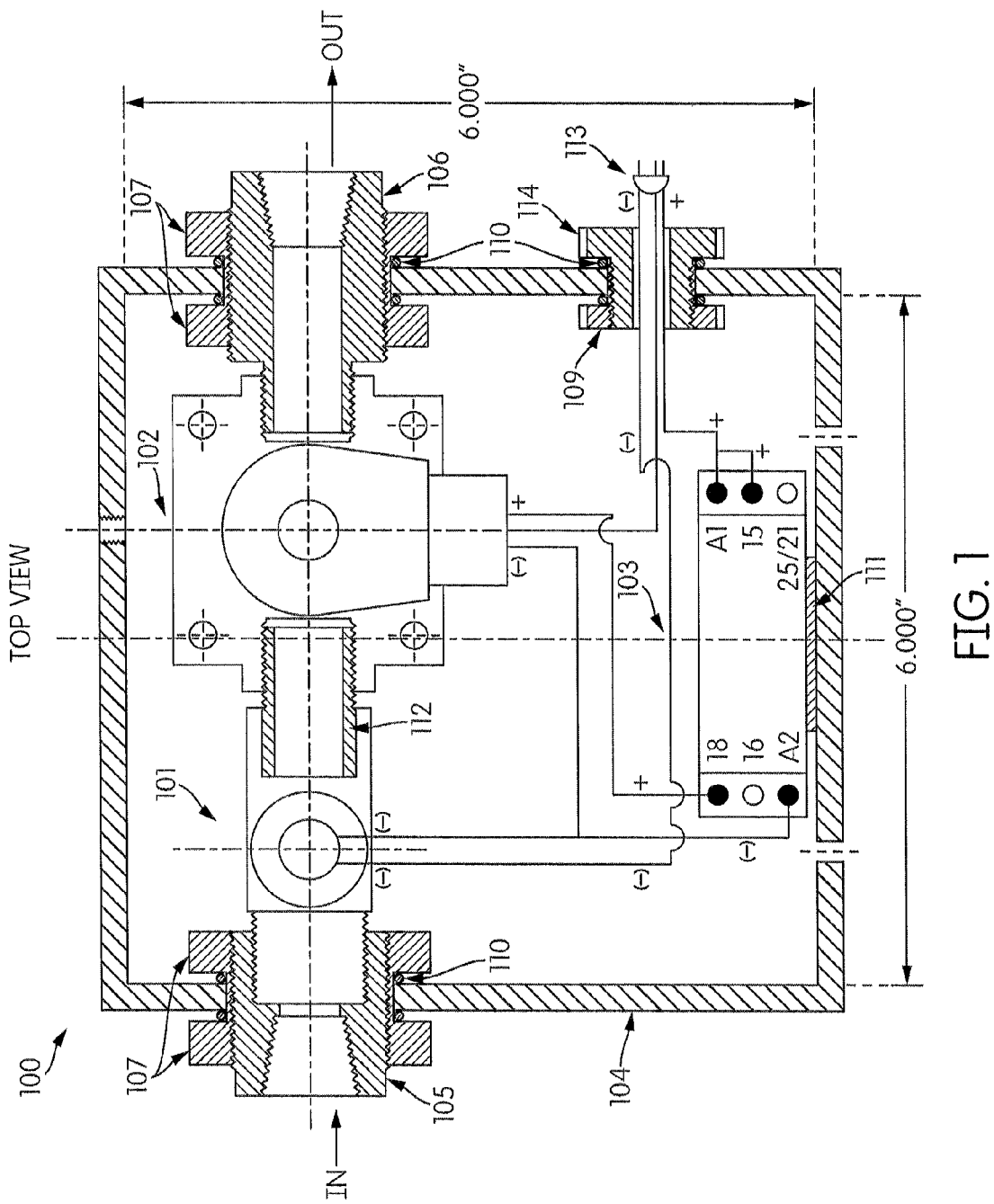
FIG. 1 shows a top view of an assembled automatic excess water flow saving system according to an embodiment of the invention inside an enclosure with its electric circuit.

Turning to FIG. 1, an embodiment of an automatic excess water flow saving system 100 is shown. System 100 includes an actuator 101, a valve 102, and a timer 103. Electrical wires connect actuator 101 and valve 102 to timer 103. As will be described in greater detail below, actuator 101 includes a switch that turns timer 103 on and off. Timer 103 in turn operates to open and close valve 102. Electric cable 113, once connected to a power source, provides electricity to system 100.

An enclosure box 104 may be used to contain the contents of system 100. In an embodiment, enclosure box 104 is water tight and UV and corrosion proof. Materials such as polyvinyl chloride (PVC) may be suitable for use as enclosure box 104. Enclosure box 104 may further include a gasketed cover (not shown), which can be affixed with fasteners such as screws. An embodiment of enclosure box 104 may measure 6 inches by 6 inches by 6 inches. The dimensions of enclosure box 104, however, may be modified depending on need, such as to accommodate different sizes of components.

Fittings are used to connect or secure different components of system 100. The fittings may be commercially available parts, custom made parts, or modifications made to commercially available parts depending on the purpose of the fittings. Exemplary design features of fittings may include threads on the inside or outside of the fittings to connect different components. Nuts that fit specific fittings may also be obtained from commercially available parts, custom made parts, or modifications made to commercially available parts. Materials such as chlorinated polyvinyl chloride (CPVC) may be suitable for the fittings and nuts.

In system 100, actuator 101 is connected on the right side to valve 102 with a fitting 112. Fitting 112 may include exterior threads on the right side to connect to valve 102 and may be smooth on the left side to connect to actuator 101. The left side of actuator 101 may be secured to enclosure box 104 with fitting 105, nuts 107, and O-rings 110. Fitting 105 may be designed as a female adapter with internal threads to connect to actuator 101 on one side and connect to an inflowing water line on the other side. Nuts 107 may include interior threads to match the outside threads of fitting 105. Similarly, the right side of valve 102 may be secured to enclosure box 104 with fitting 106, nuts 107, and O-rings 110. Fitting 106 may be designed as a male adapter to connect to valve 102 on one side and to connect to an outflowing water line on the other side. Nuts 107 and O-rings 110 secure fitting 106 to enclosure box 104. While fittings 105 and 106 and nuts 107 are described with a particular design in an exemplary embodiment, modifications to the fittings and nuts may be made as needed, such as to suit components of different sizes and designs.

Timer 103 may be secured to the enclosure box 104 through conventional means known in the art. A spacer 111 may be used to provide a buffer from the wall of enclosure box 104.

Enclosure box 104 may include a third hole to provide an opening for electric cable 113. An embodiment provides the opening with fitting 114, nut 109, and O-rings 110 secured to enclosure box 104. As discussed above with the other fittings and nuts, fitting 114 and nut 109 may be commercially available parts, custom made parts, or modifications to commercially available parts in order to provide for different sizes and designs as best suited for a system. Electric cable 113 provides power to system 100 when plugged into a power source. System 100 may be powered through other means as known in the art.

System 100 is to be installed onto the main water pipe leading to a house or other water installations. When a water outlet is opened, water flows out of the outlet after passing through system 100. In FIG. 1, the water enters system 100 through fitting 105, then through actuator 101, then through valve 102, and out through fitting 106. As will be described in greater detail below, in one embodiment, when a water outlet is first opened, valve 102 initially allows water to flow through system 100 at a reduced flow rate. The water flow causes actuator 101 to activate timer 103. Timer 103 then opens and closes valve 102 intermittently. Timer 103 may be adjusted to open and close valve 102 at any desired frequency.

As long as a water outlet is open, the switch in actuator 101 keeps timer 103 on, which will continuously operate valve 102. By opening and closing valve 102 intermittently, timer 103 controls the flow of water through the water outlet, which will be much less than that of the usual water flow to the water consuming installation. Consequently, a considerable water volume saving is achieved automatically with system 100 in houses and other water consuming installations.

Figure 2:
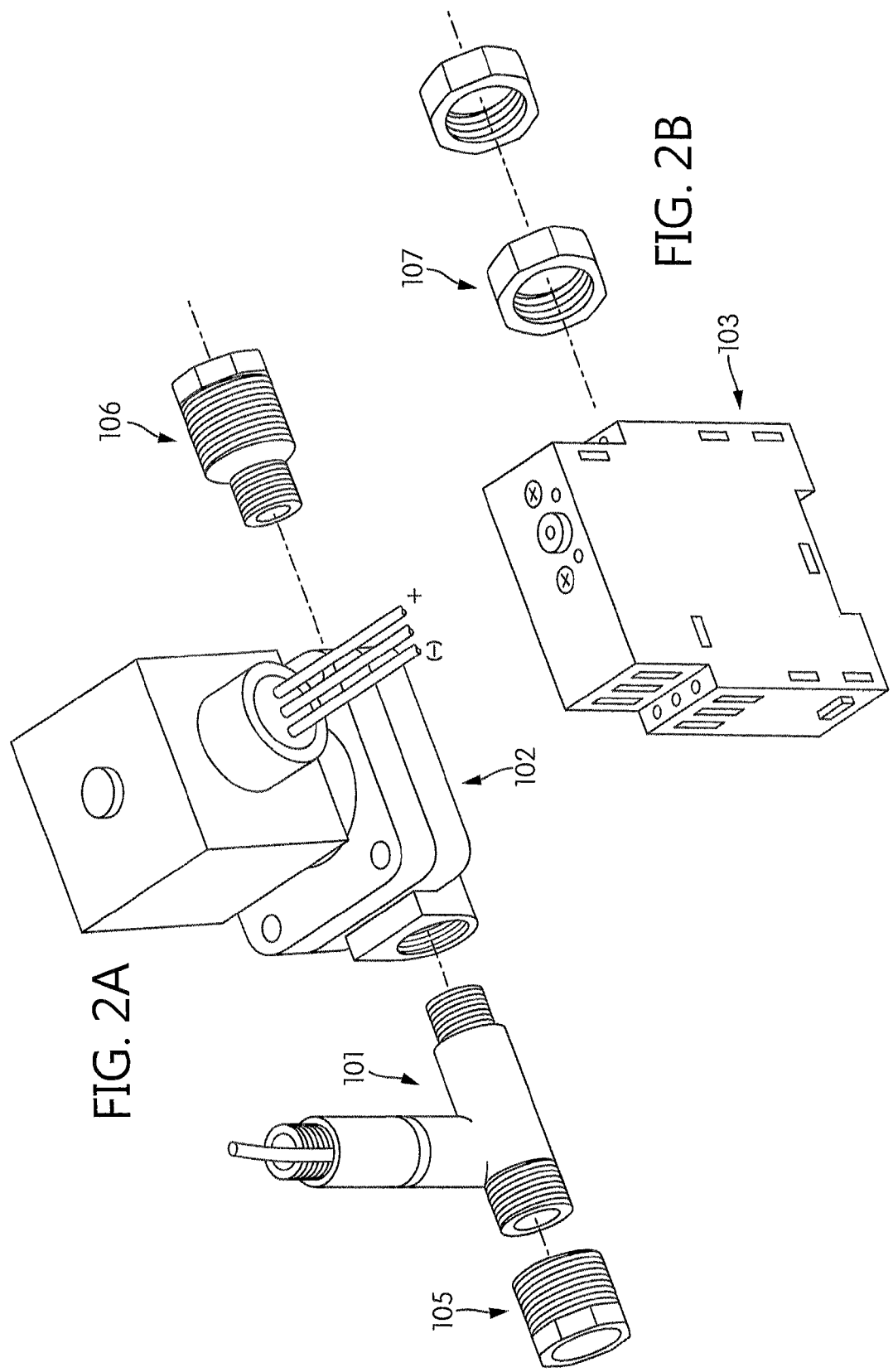
FIGS. 2A and 2B show an exploded view of components of an automatic excess water flow saving system showing an actuator, a valve, a timer, and other parts for fitting into an enclosure.

FIGS. 2A and 2B show an exploded view of some components in the automatic excess water flow saving system 100 shown in FIG. 1. The components include actuator 101 (shown with fitting 112 attached on the right side), valve 102, and timer 103. Also shown are fitting 105, fitting 106, and nuts 107.

Figure 3:
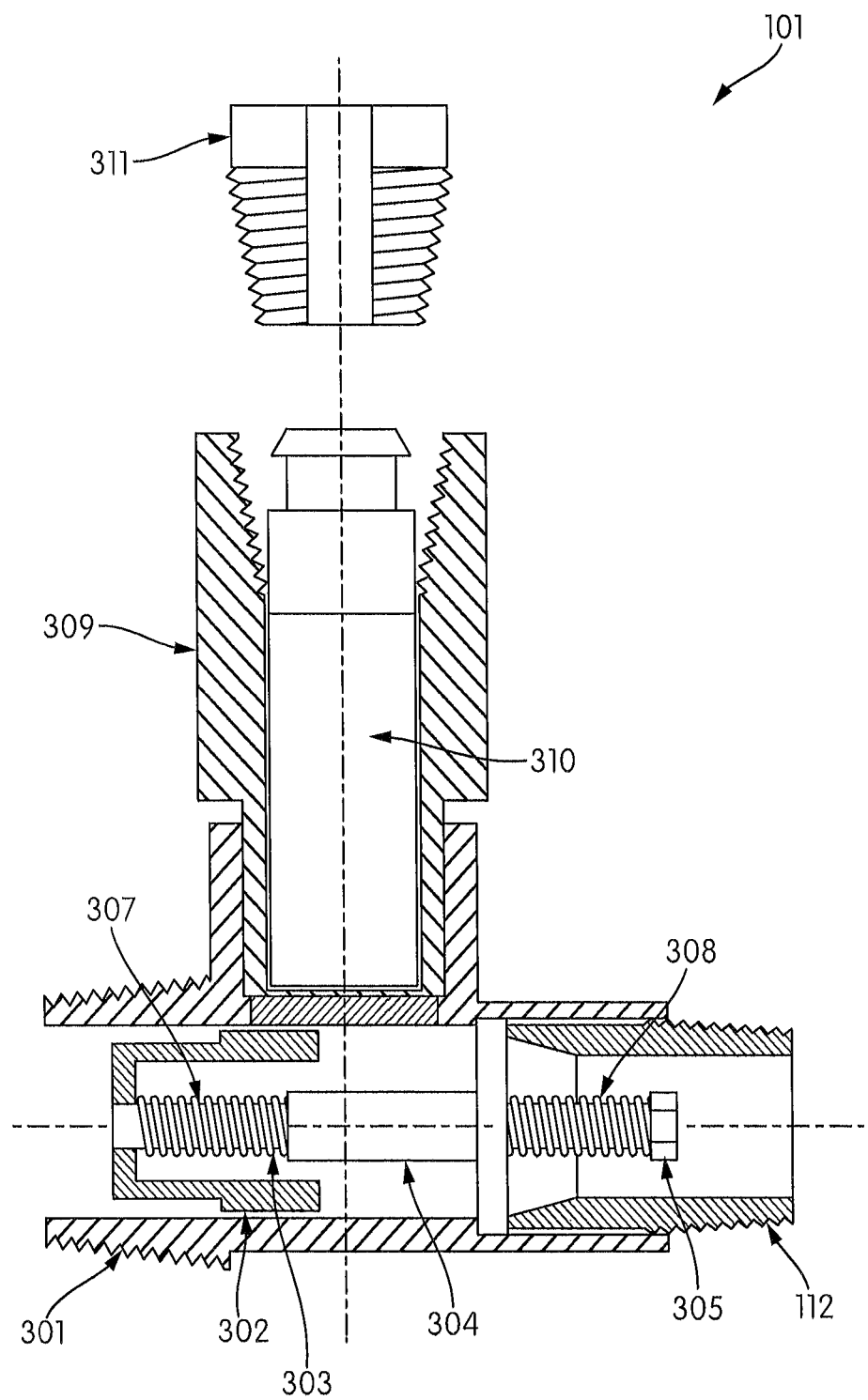
FIG. 3 shows a cross-sectional view of an assembled actuator according to an embodiment of the invention.

Turning to FIG. 3, an actuator 101 according to an embodiment is shown. The same reference numbers used throughout the figures represent the same components. Actuator 101 includes several component parts. Actuator 101 is shown in FIG. 3 with fitting 112 attached on the right side. As described above, fitting 112 connects actuator 101 to a valve.

Moving on to the component parts of actuator 101, the parts may be commercially available parts, custom made parts, or modifications made to commercially available parts. Part 301, which forms part of the body of actuator 101, may be a T-shaped pipe connector, such as a pipe tee. Part 301 may be a commercially available pipe connector modified with threads on one side. Suitable material for part 301 may be PVC.

Part 309 and part 311 make up other parts of the body of actuator 101. Part 309 is a hollow cylinder piece with a closed end that fits inside part 301. The walls of part 309 may be modified to have a lip to sit onto part 301. The end of part 309 that sits inside part 301 is closed.

Part 309 forms an enclosure for proximity switch 310 to be placed into. Proximity switch 310 may be any conventional proximity switch known in the art. Part 309 may be designed and sized to hold proximity switch 310 snugly.

Part 311 screws into part 309 to hold the proximity switch 310 in place. A hole may be made through part 311 to allow electrical cables from proximity switch 310 to extend out of actuator 101 to connect to timer and electric power cable. In an embodiment, part 311 screws into part 309. Other suitable designs may be used for part 311, such as a cap that fits over part 309.

Turning to the lower portion of actuator 101 in FIG. 3 (see also FIG. 4), additional component pieces are shown. In an embodiment, rod 303 holds the additional component pieces. Both ends of rod 303 may be threaded. Spring 307, part 304, and spring 308 may be inserted onto rod 303. A nut 305 on the right side of rod 303 may be used to hold spring 308 in place. On the other side of rod 303, part 302, which may be screwed onto rod 303, holds spring 307 in place.

FIGS. 4A and 4B show an exploded view of actuator 101 from FIG. 3. As shown in FIG. 4A, part 301 may be modified from a ½" non-threaded PVC T-pipe to have a NPT 14 thread size on one side of the pipe to fit onto a ¾" sized pipe. Pipes of other size, design, and material may be used according to need.

In an embodiment, the design of part 304 may be a cylindrical piece with a flange at one end. The flange may be a three piece flange as shown in FIG. 4B or may be of other designs. The flange of part 304 will rest on the internal lip on the right side of part 301 (FIG. 3). Part 112 will hold part 304 in place.

In an embodiment, the design of part 302 is a cylindrical piece. Part 302 is used as a target for proximity switch 310. Portions of the wall of part 302 may be cut out to allow for greater water flow through actuator 101.

When water outlets in a building are closed, spring 307 is extended which keeps part 302 outside the sensing area of proximity switch 310. When a water outlet is opened, the pressure from the water flow pushes on part 302, which compresses spring 307. Part 302 will then enter the sensing area of proximity switch 310 thereby turning proximity switch 310 on. When all water outlets are closed, the lack of flowing water pressure on part 302 allows spring 307 to extend and push part 302 back outside the sensing area of proximity switch 310.

Figure 5:
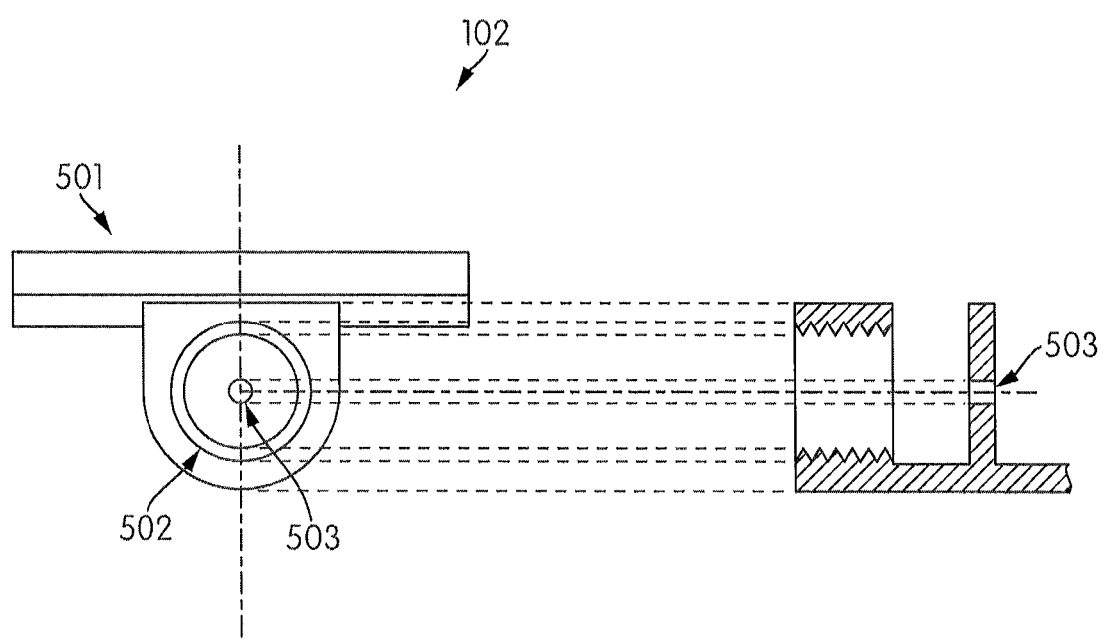
FIG. 5 shows the bypass hole inside the body of a modified normally closed water solenoid valve.

FIG. 5 is a view of a portion a valve 102 according to an embodiment. Shown are a valve body 501 and inflow orifice 502. Valve 102 may be used in system 100 as shown in FIG. 1. In an embodiment, valve 102 is a normally closed solenoid valve. Valve 102 is modified with a bypass hole 503. In an embodiment, bypass hole 503 is of an adequate diameter to have a water flow pressure great enough to push part 302 of actuator 101 (FIG. 3) into the sensing area of proximity switch and keep part 302 in the sensing area when the water outlet is opened. In an embodiment, bypass hole 503 may be 0.1015 inches in diameter. Dimensions for bypass hole 503 may be adjusted depending on need.

The opening and closing of valve 102 may be controlled by a timer. When the timer energizes valve 102, valve 102 opens and the water outflow of valve 102 is full (open valve flow plus the bypass flow). When the timer de-energizes valve 102, it will return to its original closed status. In the closed valve position, the outflow of the water will be only that of the flow by bypass hole 503. Therefore, the water outflow of the system will be intermittently full (open valve plus bypass flow) and minimum (closed valve, bypass flow only).

Figure 6A:
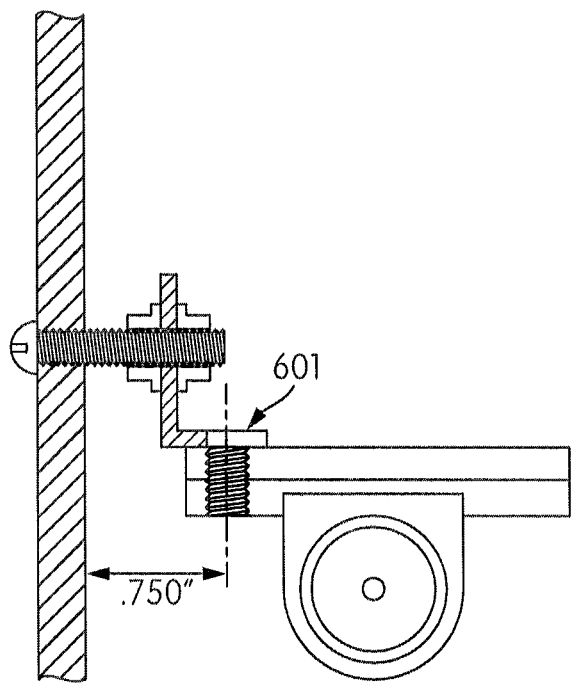
FIGS. 6A and 6B show a left side view of a valve body with a bypass hole and a mounting bracket/valve body assembly with machine screws to fix the valve to the rear wall of the enclosure box.
Figure 6B:
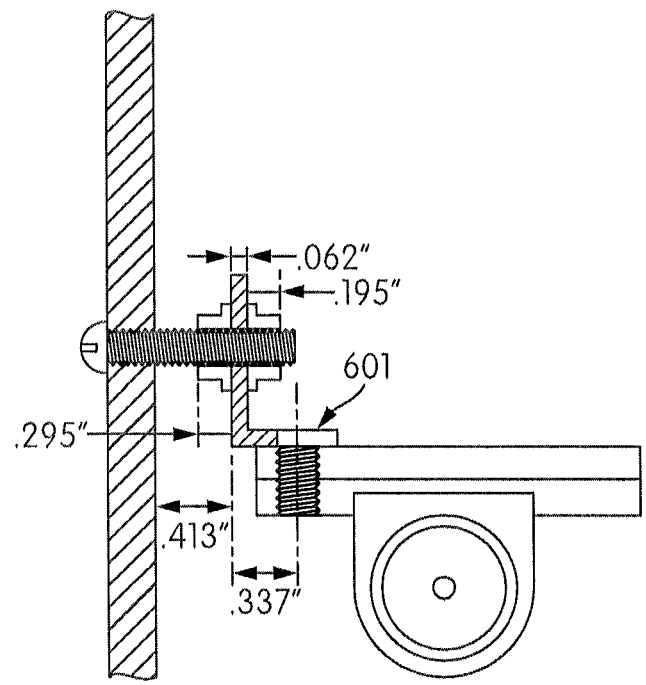

Turning to FIGS. 6A and 6B, left side views of a mounting bracket assembly to mount a valve to the wall of an enclosure box are shown. Mounting bracket 601 is secured to the valve bonnet on one side and on the enclosure box on another side. Screws may be used to secure the mounting bracket 601.

In an embodiment shown in FIGS. 6A and 6B, mounting bracket 601 is secured to the back of enclosure box with a Phillips round head 8-32×1 inch stainless steel machine screw. Flange nuts are used to secure the screw. Dimensions included in FIGS. 6A and 6B for various components are exemplary. Other size and types of components may be substituted.

Figure 7:
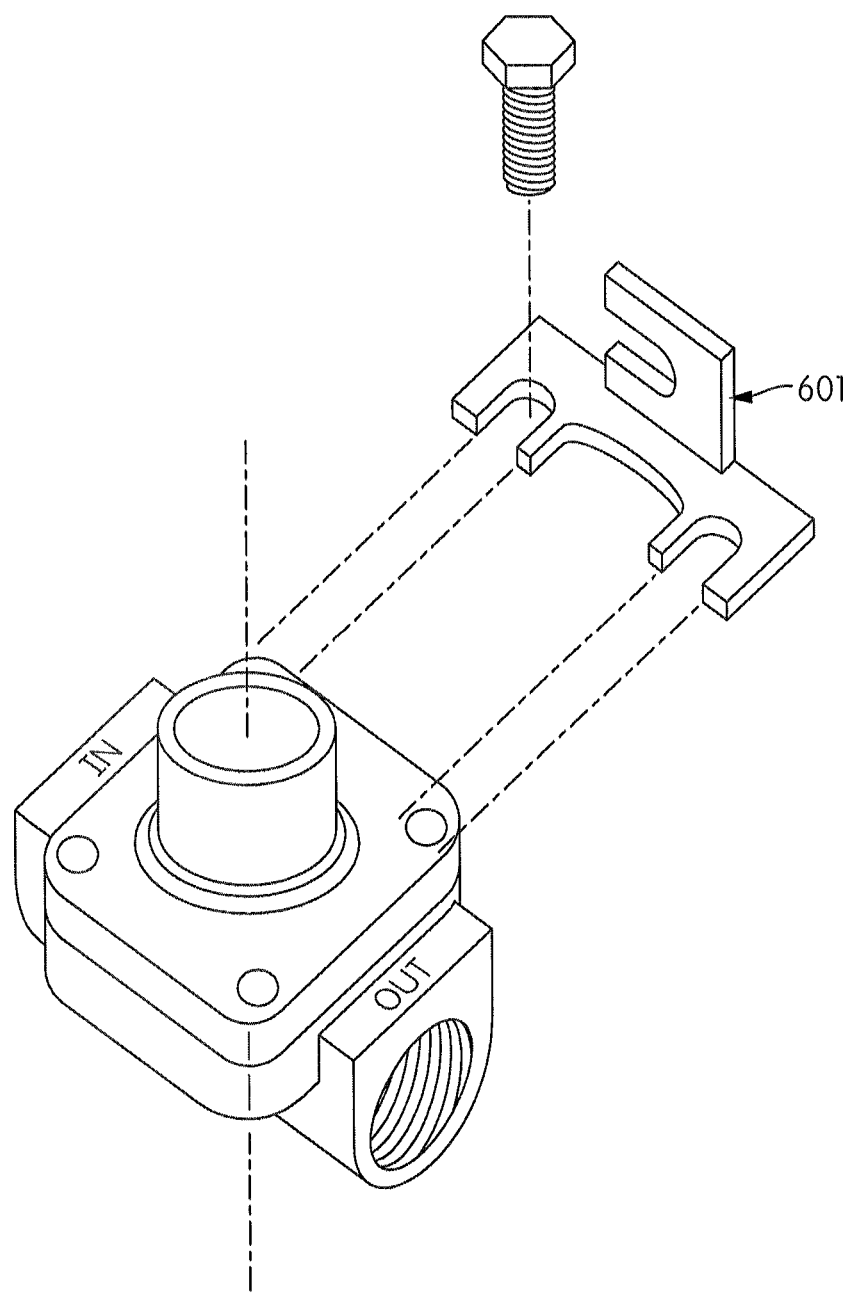
FIG. 7 shows a perspective view of a valve body and a mounting bracket.

FIG. 7 shows an embodiment of a mounting bracket 601 to mount a valve to an enclosure box. Mounting bracket 601 may be secured to a valve bonnet with a screw.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A system for automatically regulating water flow from at least one water outlet connected to a water supply line, comprising:
    an actuator coupled to the water supply line, the actuator including an actuator body, a proximity switch target, and a proximity switch;
    a valve coupled to the actuator; and
    a timer, which upon activation, is configured to cause the valve to alternate continuously at a predetermined frequency between an open state that allows a full water flow and a bypass state that allows a reduced water flow;
    wherein, in response to the water outlet being opened and providing continuous water flow,
        the water flow automatically causes the actuator to activate the timer by biasing the actuator proximity switch target to move towards a sensing region and turn the actuator proximity switch on to activate the timer, and
        the timer automatically causes the valve to alternate at the predetermined frequency between the open state and the bypass state, such that the continuous water flow provided by the water outlet alternatingly and continuously switches between the full water flow and the reduced water flow to produce a continuous, blended flow rate at the at least one water outlet, and
    wherein, in response to the water outlet being closed, the full water flow and the reduced water flow terminate.

2. The system of claim 1, wherein the valve is configured to be a normally closed, unenergized solenoid valve.

3. The system of claim 2, wherein the solenoid valve comprises a bypass hole that enables the reduced water flow.

4. The system of claim 2, wherein the timer is configured to continuously energize and de-energize the valve to alternate between the open state for full water flow and the bypass state for reduced water flow.

5. The system of claim 4, wherein the predetermined frequency at which the timer continuously energizes and de-energizes the valve to alternate between the open and bypass states is adjustable.

6. The system of claim 1, further comprising a water-tight enclosure box.

7. The system of claim 6, wherein the actuator, the valve, and the timer is contained within the water-tight enclosure box.

8. The system of claim 1, further comprising a cable to provide access to a power source for the valve and timer.

9. The system of claim 1 further including an actuator spring, such that when the water outlet is closed and there is no water flow, the proximity switch target is biased to be positioned outside of the sensing region by the actuator spring in an extended state.

10. The system of claim 1 further including an actuator spring, such that when the water outlet is open, the water flow automatically biases the proximity switch target to move within the sensing region by providing an urging force to compress the actuator spring.

11. The system of claim 1, wherein the actuator body comprises a pipe tee.

12. A method of automatically regulating water flow from at least one water outlet connected to a water supply line, by employing an actuator that includes a proximity switch target and a proximity switch, the method comprising:
    providing the actuator that includes a proximity switch target and a proximity switch;
    providing a valve;
    providing a timer, which upon activation, is configured to cause the valve to alternate continuously at a predetermined frequency between an open state that allows a full water flow and a bypass state that allows a reduced water flow;
    coupling the actuator to the water supply line that is connected to the water outlet;
    coupling the valve to the actuator; and
    electrically connecting the timer to the actuator and valve,
    wherein, in response to the water outlet being opened and providing continuous water flow,
        the water flow automatically causes the actuator to activate the timer by biasing the actuator proximity switch target to move towards a sensing region and turn the actuator proximity switch on to activate the timer, and the timer automatically causes the valve to alternate at the predetermined frequency between the open state and the bypass state, the continuous water flow provided by the water outlet alternatingly and continuously switches between the full water flow and the reduced water flow to produce a continuous, blended flow rate at the at least one water outlet, and wherein, in response to the water outlet being closed, the full water flow and the reduced water flow terminate.

13. The method according to claim 12 wherein, when the water outlet is opened, the water flow automatically biases the proximity switch target to move within the sensing region by urging compression of an actuator spring.

14. The method according to claim 12, wherein, when the water outlet is closed and there is no water flow, the proximity switch target is biased to be positioned outside of the sensing region by the actuator spring in an extended state.

15. The method according to claim 12, wherein the predetermined frequency at which the timer causes the valve to alternate between open and bypass states is adjustable.

16. The method according to claim 12, wherein the valve comprises a solenoid valve in which the timer is configured to continuously energize and de-energize the valve to alternate between the open state for full water flow and the bypass state for reduced water flow.

17. The method according to claim 16, further comprising modifying the solenoid valve with a bypass hole that accommodates the reduced water flow.

* * * * *